Dec. 15, 1953    G. SMAL    2,662,427
PROCESS FOR THE MANUFACTURE OF SAW SEGMENTS
Filed Jan. 30, 1951    3 Sheets-Sheet 1
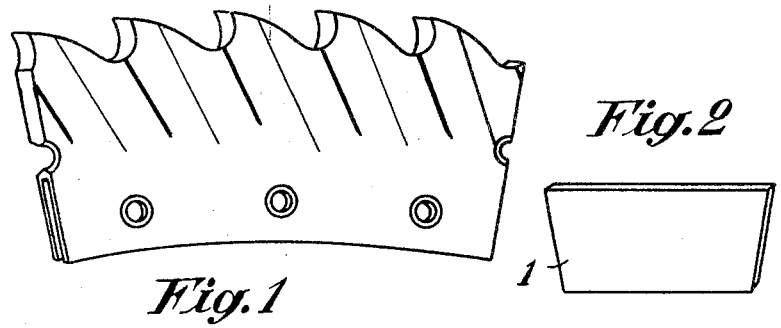
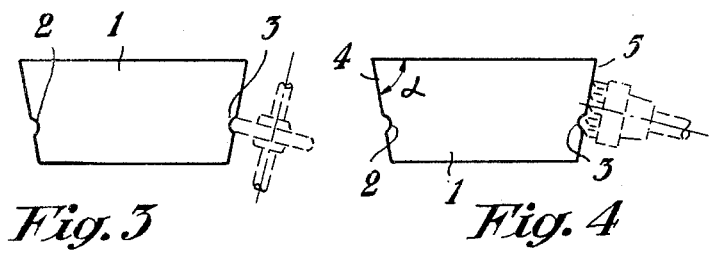
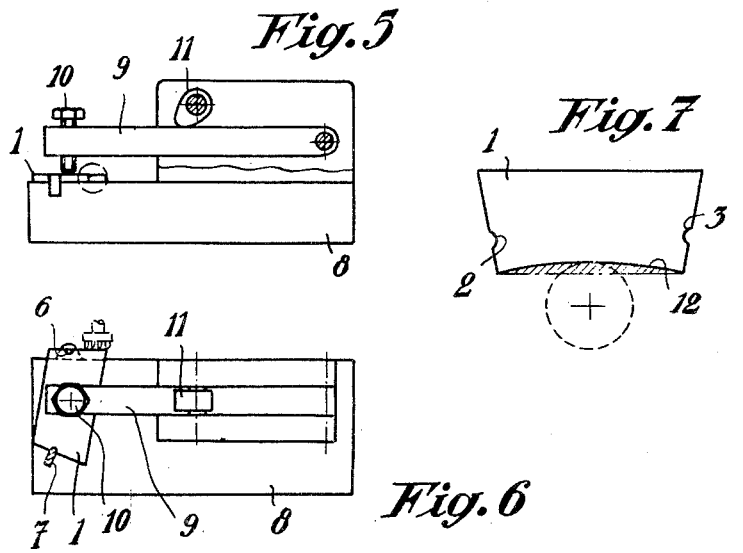
INVENTOR:
Gilles Smal
PER:

Dec. 15, 1953  G. SMAL  2,662,427
PROCESS FOR THE MANUFACTURE OF SAW SEGMENTS
Filed Jan. 30, 1951  3 Sheets-Sheet 2
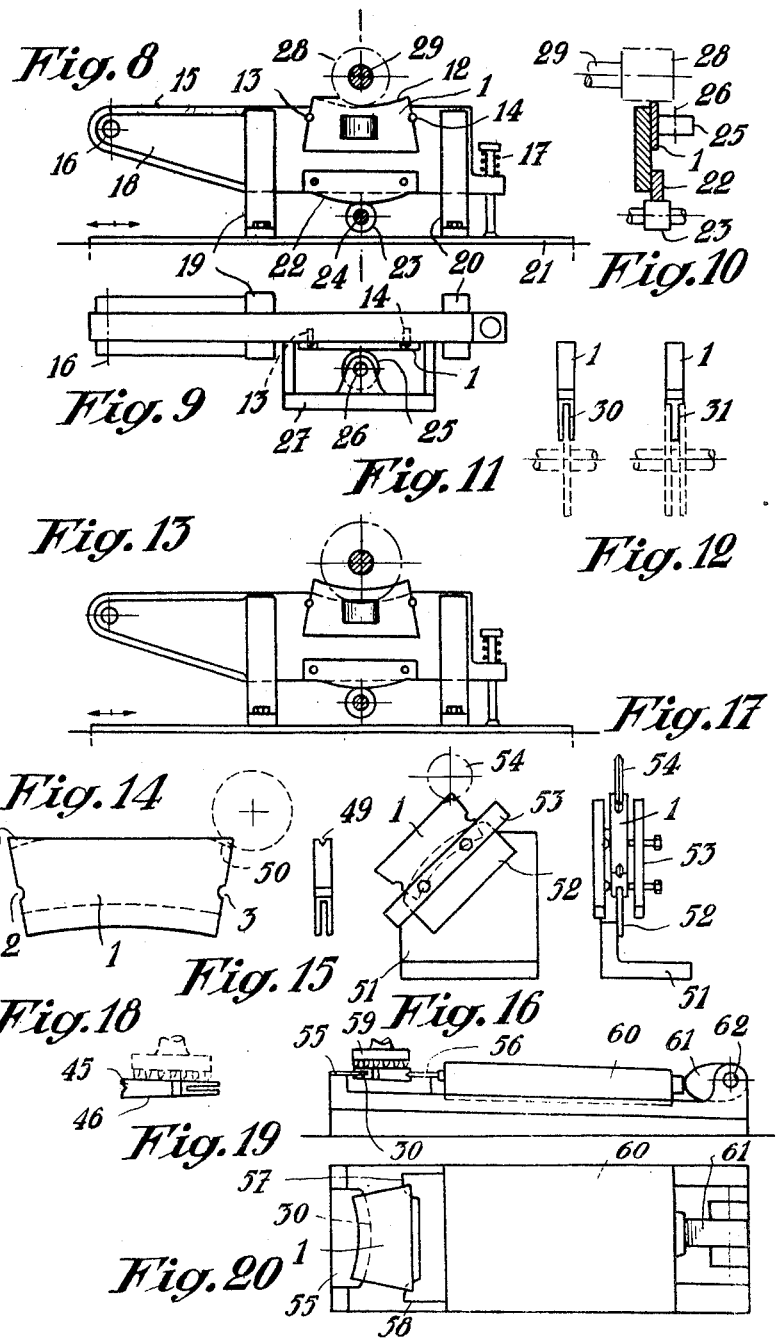

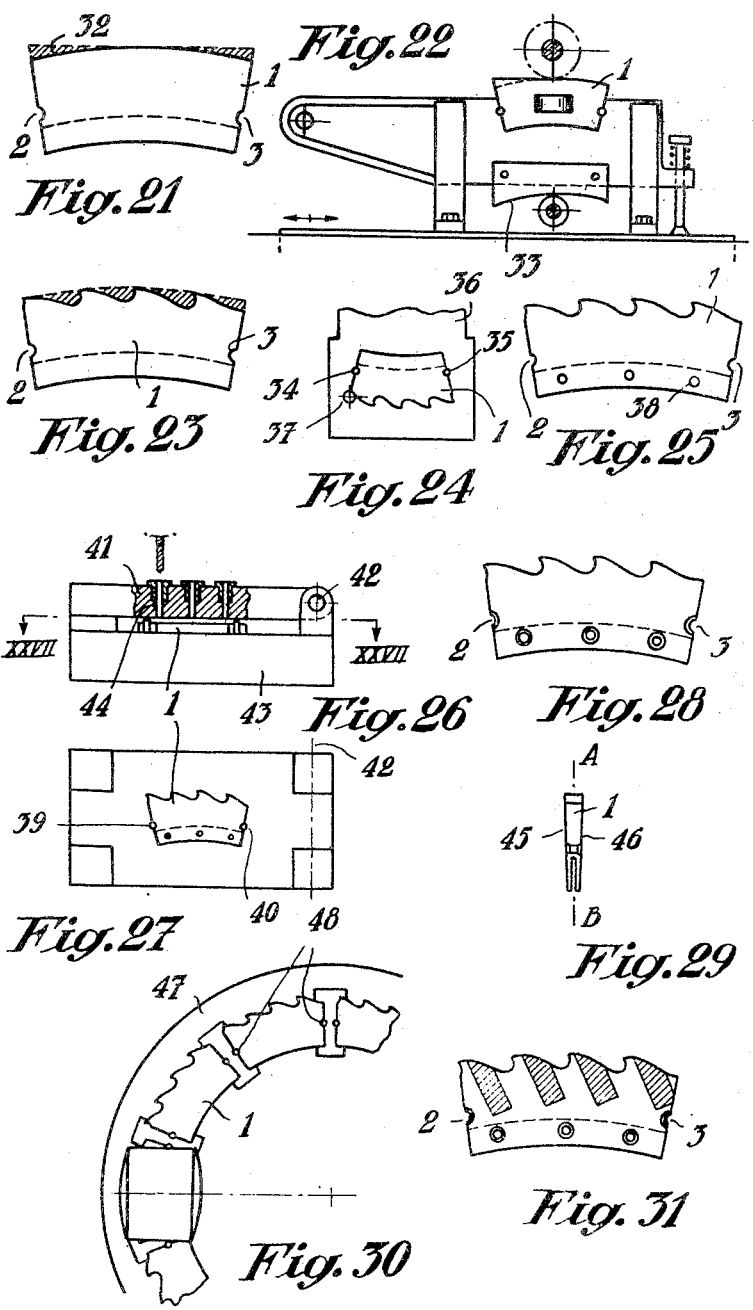

Patented Dec. 15, 1953

2,662,427

UNITED STATES PATENT OFFICE 2,662,427

PROCESS FOR THE MANUFACTURE OF SAW SEGMENTS

Gilles Smal, Herstal, Belgium

Application January 30, 1951, Serial No. 208,457

Claims priority, application Belgium
February 3, 1950

6 Claims. (Cl. 76—112)

Saw segments made of high-speed steel and circumferentially fixed to a bearing disc, in order to form a circular saw, are known.

Such saw segments present serious difficulties to the industrial manufacture because of their relatively complex shape and of the imperative need of great precision indispensable for the securing of a suitable tooth crown.

In a general way, the processes of manufacture at present known require the application of means and machine tools that are relatively costly and cause them to lie idle for considerable periods, if the great number of different models of such segments is taken into account.

The present invention has for its chief object the determining of the successive phases of the processes in such a way that not only is the use of particlarly delicate and costly machines obviated, but the manufacture can be organized with the greatest flexibility, even providing for the frequent changes in models and sizes of the saws to be produced. The process of the invention is equally characterized in that the machines, respectively the tools are readily adapted to all the changes in the sizes of saw segments to be produced, without any interference with the precision or the speed of each of the operations characterizing the said process.

The different conditions are provided for by the new conception which is the base of the method of operation according to the invention, and which consists in making in the basic part of the saw segment two pairs of notches which will serve as the correct location means of the workpiece, so that, the said notches having been made with precision, all the subsequent operations will derive advantage from the same precision and thus assure the execution of any strictly identical piece.

The two first notches, semi-cyclindrical, are made in the two lateral sides of the basic piece, and these two notches will serve to assure the correct position of the piece during all the operations relating to the shaping and the dressing of the four sides of the basic piece, to the cutting of the teeth, and to the boring of the rivet holes; the two notches of the second pair are made in the thickness of the basic piece and serve to assure the proper position of the said basic piece, particularly during the cutting of the two large faces of the saw segment.

Owing to this new conception, it is possible to manufacture saw segments industrially, rationally and economically, with the help of machines relatively very simple, each machine being, for example, intended to carry out one of the successive operations of the general process.

Merely as an example, without any limiting character as to the order of the operations and to the means for putting the method into practice, a preferable form of organization of the process is hereinafter described in greater detail, with references to the annexed drawings, in which:

Figure 1 is a perspective view of a saw segment of the type forming the object of the present invention;

Figure 2 is a perspective view of a rough plate;

Figure 3 is a front view of the rough workpiece with the first series of regulating notches;

Figure 4 shows how the workpiece is machined to correct length and angle by a cutting operation;

Figures 5 and 6 are respectively a very diagrammatic side view and plan view of a device adapted to the carrying out of the operation shown in Figure 4;

Figure 7 shows the operation of the cutting of the inner curve;

Figures 8, 9 and 10 are respectively a very diagrammatic front elevation, a plan view and a side view with partial section of the operation represented in Figure 7;

Figures 11 and 12 show the operation of cutting the groove or the setting pin of the saw segment;

Figure 13 is a diagrammatic front elevation of a device adapted to the making of the groove or the pin represented in Figures 11 and 12;

Figures 14 and 15 are respectively a front elevation and a side view of the operation of cutting the second pair of notches;

Figures 16 and 17 show very diagrammatically the devices adapted to carry out the cuttings shown in Figures 14 and 15;

Figure 18 shows very diagrammatically the cutting of the two large faces of the segment;

Figures 19 and 20 roughly show a device for putting into effect the operation of Figure 18;

Figure 21 shows the cutting operation of the outer curve;

Figure 22 is a very diagrammatic front elevation of a device adapted to the carrying out of the operation represented in Figure 21;

Figure 23 shows the operation of toothing;

Figure 24 is a very diagrammatic view of a device adapted to the carrying out of the operation represented in Figure 23;

Figure 25 shows the operation of the boring of the rivet holes;

Figures 26 and 27 are very diagrammatic views of a device for carrying out the boring operation represented in Figure 25;

Figure 28 shows the bevelling operation;

Figure 29 shows the trueing of the two large faces of the saw segment;

Figure 30 is a partial front view of a device for carrying out the operation that is the object of the preceding figure;

Figure 31 shows the operation of grinding the cooling grooves, the last operation in the process of the manufacture of saw segments.

According to the invention, the process of the manufacture of saw segments consists, starting from the rough trapezoidal workpiece 1, in simultaneously producing two lateral notches 2 and 3, generally semi-cylindrical, the relative position of which corresponds exactly to the span between two adjacent rivets uniting the adjacent segments when the circular saw is mounted. These two lateral notches will serve as a systematic means for adjusting the exact position of the piece in a great number of operations. The result is that, the different faces of the segment being treated with the help of a common means of adjustment, not only is great precision of execution assured but it becomes equally possible to adapt very simple equipment both easily and relatively economically.

The two lateral notches 2 and 3 may be effected by any known means, for example by cutting.

To show in the best possible light the substantial advantages of such a conception of working, the principal phases of the process in which the said notches intervene as a common adjusting means, are shown hereafter with references to the annexed drawings.

Figure 4 shows the third operation in which the rough workpiece is machined to correct length and angle by a cutting operation. It is therefore necessary in order that the cutter may work correctly, that the piece 1 be firmly fixed and held in such a position that not only the two lateral sides 4 and 5 be strictly symmetric, but also that the angle $a$ be strictly exact.

Such a condition may be assured by a simple device, for example one of the kind shown in Figures 5 and 6. In the present instance, the piece 1 is almost instantaneously steadied between a fixed abutment 6 and a swinging catch 7 fixed on a base plate 8, to which is linked a lever actuating the member 1 by the free end of a bolt 10, which goes through it, and the projecting part of which in contact with piece 1, can be adjusted to length; this lever may be actuated by a clamping cam 11, the operation of which is practically instantaneous. By this engagement it results that, thanks to the lateral notches 2 and 3, the piece 1 to be cut can be quickly put into the correct position and also rapidly firmly immobilized on the base plate, respectively the carriage of the cutting machine. Not only are the manipulations very rapid, but a strictly constant working of the cutter and consequently a practically perfect machining to correct length and angle of the workpiece 1 are assured.

Likewise, for the cutting of the inner curve 12 of the piece 1, the latter will be placed in position and correctly fixed by means of the initial notches 2 and 3. In spite of the apparent difficulty of this operation it can be effected with the same facility as the preceding operation. An adequate arrangement is roughly shown in Figures 8, 9 and 10. The piece 1, the inner curve 12 of which is to be cut, is at once put into the correct position by means of the two pins 13 and 14 properly fixed in the swinging plate 15 linked at one end round a pivot 16 and pulled at the other end by a return spring 17 which permanently tends to lower it. The pivot 16 rests on an overhanging part 18, fixed to one of the uprights 19. This upright, as well as the front upright 20, is fixed to a base plate arranged in shape of slide carriage, so adapted as to be actuated in an alternating rectilinear movement by an appropriate mechanism (not shown). The swinging plate 15 bears underneath a gauge 22 in contact with a roller 23, the shaft 24 of which does not participate in the sliding movement of the plate 21. The same swinging plate 15 bears laterally a clamping cam 25, the axle of which rests on a gate 27 fixed to the swinging plate. The clamping cam is actuated by a lever (not shown). The two uprights 19 and 20 may profitably serve as guides to the rocking lever 15 in order to prevent any transversal deformation. This device is surmounted by the cutter 28, the shaft 29 of which is at right angle to the plane of the swinging plate 15.

The working of this device is simple: all the parts, except the roller 23 and the cutter 28 share a sliding motion in a perpendicular or an approximately perpendicular direction to the shaft 29 of the cutter 28. The swinging plate 15 undergoes not only the said sliding movement, but also and at the same time a vertical movement arising from the guiding of the gauge 22 by the roller 23. The resultant of these two rectilinear motions is very exactly the curve characterizing the inner curve 12 of the plate 1.

It will be remarked once more that the correct position of this inner curve is dependent on the adjusting means constituted by the lateral notches 2 and 3. Exactly the same device may be used for the execution of the fifth and eighth operations, which consist respectively of the cutting of a groove or notch 30 or of the pin 31 and of the cutting of the outer curve 32 of the member 1. To cut the notch 30 or the pin 31 (Figures 11 and 12) it is enough, in order to fit the device shown in Figures 8, 9 and 10, to change the cutter 28 by replacing the one already described, by a cutter of little thickness adapted to produce the notch 30 or by two similar cutters slightly separated from each other, in order to be able to produce the pin 31, all the other arrangements of the machine roughly described being retained, since the groove, respectively the pin, must be correctly spaced at regular intervals along the inner curve.

To effect the cutting of the outer curve 32 (Figure 21), the object of the eighth operation of the process, it suffices to, as shown in Figure 22, to replace the convex gauge 22 by a concave gauge 33, the profile of which will be perfectly determined to assure a correct curve in the basic piece 1.

The same means of adjustment of the correct position of the piece is utilized or may be utilized in the toothing operation, whatever the process or the machine adopted for the process may be. In fact, as shown in Figure 24, the piece 1 can easily and instantaneously be placed in correct position by the guiding of the two pins 34 and 35 fixed to the support 36 of the machine for shaping the toothing. The cutter 37 can be displaced by any appropriate mechanism (not shown). For preference, application will be made of the process and the machine which are the object of another patent filed in the name of the applicant.

Finally, the same simple means of adjustment will be used for the correct location of the piece during the tenth operation in the course of which the rivet holes 38 are bored and also in the course of the third operation during the trueing by the grinding of the two large faces of the saw segment.

For the boring of the holes 13 (Figure 25), the piece 1 will be once more immobilized between the two pins 39 and 40, and this arrangement will allow of the use being made of a gauge 41 linked by a shaft 42 on the underlying support 43. The gauge 41 comprises a series of holes 44 corresponding very exactly in position and in sizes, to the rivet holes 38 to be made in the piece 1. This simple device conduces to rapid working but always with the same security. As to the operation of trueing the large faces 45 and 46 of the saw segment 1, it will be enough to fix the segments to be trued to the plate 47, for example, by means of screws 48 inserted in the same adjustment grooves 2 and 3 thus acting as temporary rivets. It is these same grooves 2 and 3 that will be used in the operation as a systematic means of positioning.

As will be seen, the said grooves systematically form the base of most of the operations of the process, that is to say, consequently also the base of the process itself.

According to the invention, the process may be profitably completed by a second pair of grooves made in the thickness of the matter at the two corners of the outer curve, the two grooves being temporary and expressly made for the sole purpose of serving as a means of adjustment and of control of the position for the cutting of the inclined faces 45 and 46 (Figure 18). In fact, in this operation the grooves 2 and 3 could only with difficulty intervene and it has therefore been judged expedient to create a complementary means.

To make the grooves or notches 49 and 50 as represented in Figures 14 and 15, use could easily be made, as shown in Figures 16 and 17, of a device comprising at least one support 51, on which is fixed a plate 52, the thickness of which is the same or nearly the same as that of the disc that is later to form the body or central part of the circular saw. It suffices to place the piece 1 astraddle over the plate 52, just as it were placed on the body of the saw. And the plate 52 is thus fixed to the piece 1 by a clamping collar 53 of suitable shape. The plate 52 is directed in such a way that the piece 1 faces the cutter 54 in an inclined position, with the result that the said cutter can make only the corner notches 49 and 50, exactly in the shapes, sizes and directions compatible with their further use. This use, as represented in Figures 19 and 20, consists in serving as means to steady in the correct position the piece 1 during the cutting operation, which operation has to be particularly precise with regard to the symmetry of the two faces 45 and 46 in relation to the longitudinal median plane (A-B) (Figure 29) of the workpiece 1. In this instance, this workpiece is immobilized between a plate 35 engaging the groove 30 of the saw segment and a plate 56 with two jutting ends 57 and 58 shaped and directed in relation to the profile and the direction of the temporary notches 49 and 50. The plate 1 is thus firmly fixed and the notches 49 and 50 are such and cooperate with the plate 55 in such a manner, that after the cutting of one face, the plate 1 may simply be turned 180° and fixed by the same means, while being assured of perfect symmetry after the passage of the cutter 59. The plate 56 is fixed, whereas the plate 55 is linked to a slide carriage 60 actuated by a clamping cam 61 adapted to turn round a shaft 62 through the action of an operating lever (not shown). The motion of the carriage, and consequently that of the plate 55 is rapid, and the work can therefore be done at a great speed.

The notches 49 and 50 will disappear during the cutting of the outer curve, operation shown in the Figure 21 and previously described, whereas the lateral grooves 2 and 3 present a permanent character, since, by juxtaposition of the two adjacent saw segments, two such semi-cylindrical grooves will form a rivet hole, and the rivet will be destined to fix together the overhanging parts of the said adjacent segments.

As will be seen, the whole process is based, in principle, on the two lateral grooves 2 and 3, which are engaged in almost all the operations of the process of manufacture, and partly on the two temporary notches, as described previously.

Needless to say, the order of the operations may be modified, just as use of devices manifestly different from these which have been roughly described above and shown in the annexed diagrams, can be employed. To carry out the present process, it is necessary but it suffices, from the beginning of the process, to make at least two lateral notches for the purpose of using them as a means to adjust the correct position of the workpiece in many operations, the said notches preferably being maintained to cooperate, after the placing into position of the saw segment, in the making of the rivet hole.

What I claim is:

1. In a method of making a saw segment from a trapezoid plate, the steps comprising, cutting two opposite notches in the lateral inclined surfaces of said plate, positioning said plate with said notches between corresponding notch engaging members, cutting the shorter of the parallel sides of said plate to impart thereto a circular concave shape, cutting a groove into said concave surface, and cutting the other side of said plate to impart thereto a convex shape, said convex and concave shape being concentric with each other and with said two notches.

2. In a method as claimed in claim 1, together with, subsequently registering, for positioning, said notches with corresponding notch engaging members on a tooth cutting machine, holding said plate in said position, and cutting said teeth.

3. In a method as claimed in claim 1, together with, subsequently placing said plate on a drill gauge with the notches registering with notch engaging members for positioning on said gauge, exerting pressure on said plate for holding it in position and guiding drills through that gauge for perforating said plate.

4. In a method as claimed in claim 1, together with, the steps comprising, supporting said plate including engaging for support said groove cut in said concave surface, and machining the opposite front and rear surfaces of said plate for trueing.

5. In a method of making a saw segment from a trapezoid plate, the steps comprising, cutting two oppositely disposed notches in the lateral inclined surfaces of said plate, thereafter positioning said plate with said notches between corresponding notch engaging members, subsequently machining said inclined surfaces, thereafter positioning said plate on a machine between notch engaging members thereon and imparting on said machine to said plate a concave shape and respectively a convex shape to the shorter and longer parallel sides of said plate, cutting on said machine a groove in said concave surface, cutting teeth in said convex surface, then engaging said plate on a gauge between notch engaging members thereon and drilling holes in said plate while in said gauge, machining the rear and front surfaces of said plate, and placing said saw segment into a saw segment holder with the notches between notch engaging members thereof.

6. In a method of making from a trapezoid plate, and subsequently accurately positioning in a holder, a saw segment, the steps comprising, cutting two opposite notches spaced apart for a predetermined distance, each notch disposed in one of the inclined surfaces of said plate, and registering said notches for accurate positioning in engagement with corresponding notch engaging members, first on a series of succeeding machines for successive plate machining, and finally adjacent and in circular alignment with similar saw segments in a holder to complete a circular accurately dimensioned saw.

GILLES SMAL.

References Cited in the file of this patent

UNITED STATES PATENTS

| Number | Name | Date |
|---|---|---|
| 279,369 | Foerster | June 12, 1883 |
| 336,568 | Jackson | Feb. 23, 1886 |
| 1,293,897 | Parker | Feb. 11, 1919 |
| 1,306,741 | Blanchard | June 17, 1919 |
| 1,431,680 | Petersen | Oct. 10, 1922 |
| 1,633,739 | Gaisman | June 28, 1927 |
| 1,738,032 | Behrman et al. | Dec. 3, 1929 |
| 1,847,577 | Thompson | Mar. 1, 1932 |

FOREIGN PATENTS

| Number | Country | Date |
|---|---|---|
| 123,768 | Germany | July 10, 1931 |